Jan. 8, 1963   R. D. SHOMO   3,071,945
SHEAR KEY
Filed June 26, 1961
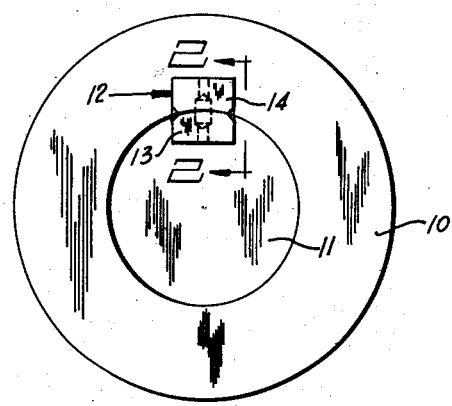
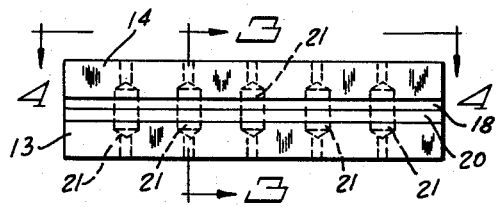
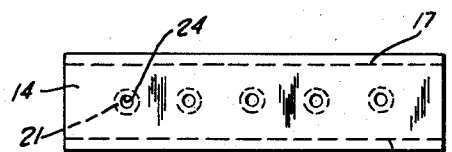
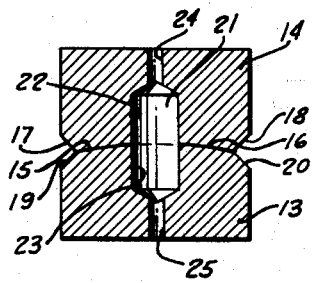
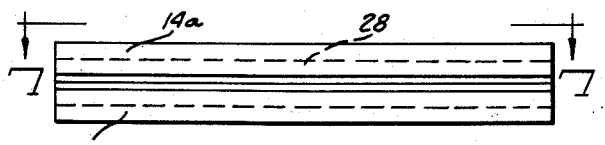
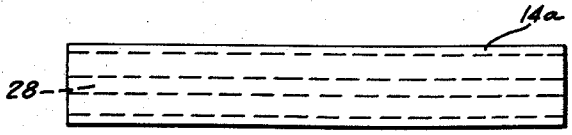
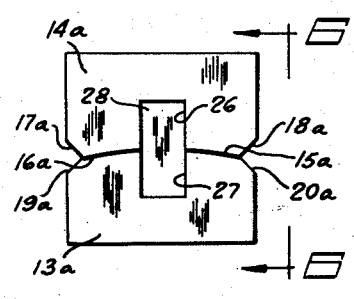
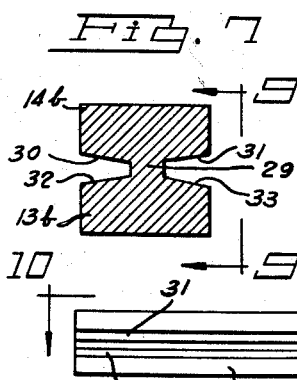
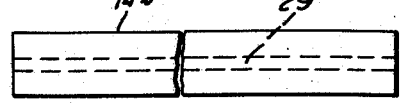
INVENTOR.
ROBERT D. SHOMO
BY
Donnelly, Mentag & Harrington
ATTORNEYS

United States Patent Office 3,071,945
Patented Jan. 8, 1963

3,071,945
SHEAR KEY
Robert D. Shomo, Taylor, Mich., assignor of one-third to Ernest S. Shomo, Taylor, and one-third to Claude R. Boyd, Dearborn, Mich.
Filed June 26, 1961, Ser. No. 119,652
7 Claims. (Cl. 64—28)

This invention relates to shear keys for releasably interlocking two members together, as for example, a shaft and a gear wheel or the like.

It is an object of the present invention to provide an improved shear key which will fit all existing keyways and which is adapted to break the connection between a shaft and a gear wheel or the like when the shaft is overloaded.

It is another object of the present invention to provide an improved shear key which comprises a pair of main portions which are interconnected by a shear means which may be a plurality of replaceable shear pins, a replaceable strip of shear material or a narrow longitudinally extended integral shear section. The shear means is adapted to shear at a certain predetermined torque or overload in accordance with the requirements of use to which the shear key is to be employed.

It is a still further object of the present invention to provide a novel and improved shear key which is simple and compact in construction, economical of manufacture and efficient in operation.

Other objects, features and advantages of this invention will be apparent from the following detailed description and appended claims, reference being had to the accompanying drawing forming a part of the specification wherein like reference numerals designate corresponding parts of the several views.

In the drawing:

FIG. 1 is an elevation view of one end of a shaft, and the hub of a gear wheel which is operatively connected to the shaft by means of a shear key made in accordance with the principles of the invention;

FIG. 2 is an enlarged side elevation view of the shear key shown in FIG. 1, taken substantially along the line 2—2, and looking in the direction of the arrows;

FIG. 3 is an enlarged elevational section view of the shear key illustrated in FIG. 2, taken along the line 3—3 thereof, and looking in the direction of the arrows;

FIG. 4 is a top plan view of the shear key illustrated in FIG. 2, taken along the line 4—4 thereof, and looking in the direction of the arrows;

FIG. 5 is an end elevation view of a second shear key embodying the principles of the invention;

FIG. 6 is a reduced side elevation view of the shear key illustrated in FIG. 5, taken along the line 6—6 thereof, and looking in the direction of the arrows;

FIG. 7 is a top plan view of the shear key illustrated in FIG. 6, taken along the line 7—7 thereof, and looking in the direction of the arrows;

FIG. 8 is an elevational section view of a third shear key embodying the principles of the invention;

FIG. 9 is a reduced side elevation view of the shear key illustrated in FIG. 8, taken along the line 9—9 thereof, and looking in the direction of the arrows; and, FIG. 10 is a broken, top plan view of the shear key illustrated in FIG. 9, taken along the line 10—10 thereof, and looking in the direction of the arrows.

Referring now to the drawings, and in particular to FIGS. 1 through 4, the numeral 10 indicates the end of a hub of a gear wheel or the like which is adapted to be releasably interlocked on the shaft 11 by means of the shear key generally indicated by the numeral 12. For the purpose of the present description it will be assumed that the shaft 11 is the driving member and that the hub 10 of the gear wheel is the driven member.

As best seen in FIGS. 2 and 3, the shear key 12 comprises the lower elongated part 13 and the mating elongated upper part 14. The shear key parts 13 and 14 may be termed the first and second shear key parts, respectively. As shown in FIG. 1, the lower part of the shear key is adapted to be seated in a suitable elongated slot formed in the periphery of the shaft 11, and the shear key part 14 is adapted to be slidably mounted into a similar elongated mating recess in the periphery of the bore in the hub 10.

As shown in FIGS. 1 and 3, the outer surface or upper surface of the lower key part 13 is convexly curved to the radius of the shaft 11 to prevent binding when the two parts of the shear key are separated from each other by a shearing action, as more fully described hereinafter. The lower surface of the upper key part 14 is concavely curved to the radius of the bore in the hub wheel 10 to also prevent binding after a shearing action. The lower outer edges of the upper key portion 14 are bevelled or chamfered as indicated by the numerals 17 and 18. The upper longitudinal edges of the lower key part 13 are also bevelled or chamfered as indicated by the numerals 19 and 20.

The shear key 12 includes a plurality of shear pins 21 which are disposed perpendicularly to the longitudinal axis of the key and at longitudinally spaced apart positions as shown in FIG. 2. The one end of the shear pins 21 is mounted in a suitable bore as 22 which extends inwardly into the upper key portion 14 from the lower concave surface 16. The other ends of the shear keys 21 are mounted in a similar and aligned bore as 23 which extends downwardly and inwardly into the lower key portion 13 from the upper convexly curved surface thereof. A reduced bore 24 communicates with the enlarged bore 22 in the upper key portion 14 to permit the sheared pin portions to be pushed out of the bores 22. A similar reduced bore as 25 is also formed through the lower key portion 13 and in alignment with each of the bores 23 to permit the sheared pins to be pushed out of the bores 23.

The shear key 12 is dimensionally the same as a standard lock key. The shear key portions 13 and 14 are made from any suitable material, as for example, a tool steel or the like. The shear pins 21 are also made from any suitable material, as for example, a metal or the like which is adapted to break when a predetermined torque is impressed thereon.

In the use of the shear key illustrated in FIGS. 1 through 4, the shear key 12 releasably connects the shaft 11 to the hub 10 of the gear wheel so that when the shaft 11 is rotated in either direction, the hub 10 will also be likewise rotated through the shear key 12. The shear key 12 is adapted to be used in all standard keyways. When the shaft 11 drives the hub 10 in either direction, the pins 21 will be subjected to shearing strains created by the torque being transmitted from the shaft 11 to the hub 10. The hub 10 will continue to be driven by the shaft 11 so long as the shearing strains do not exceed the shear strength of the pins 21. Upon the occurrence of an overload on the shaft 11, the pins 21 will shear or snap or otherwise be broken in two with the one portion of each pins remaining the bore 22 in the shear key part 14 and the other portion of each key remaining in the bore 23 in the shear key part 13. The shearing of the pins 21 severes the driving relation between the shaft 11 and hub 12 and relative rotation between them may then occur. Due to the curved mating edges 16 and 17 of the key parts 13 and 14, the relative rotation between the shaft 11 and the hub 10 will not score either the shaft 11 or the bore in the hub 10. By varying the number of shear pins 21, a wide range of torques may be available at which the pins will break and the driving relationship between the shaft 11 and the hub 10 released. It will be seen that as few as one shear pin 21 may be used. A still wider torque range may be available by varying the diameter and composition of the shear pins 21. The shear key of FIGS. 1 through 4 may be reused over and over again, and only the sheared pins 21 are replaced. Experience has shown that the shear pin of FIGS. 1 through 4 is a low cost, simple, fool proof and positive overload protection for all key members.

FIGS. 5, 6 and 7 illustrate a second embodiment of the invention, and the parts of the shear key of this embodiment which are similar to the parts of the embodiment of FIGS. 1 through 4 are marked with corresponding reference numerals followed by the small letter "a." This embodiment is the same structurally as the first embodiment, but the exception is that the shear pins 21 are replaced by a single longitudinally extended, centrally disposed shear strip which is substantially rectangular in cross section. The shear strip is indicated by the numeral 28, and may be made from any suitable material so as to shear when the predetermined maximum driving torque is exceeded.

As best seen in FIG. 5, the shear strip 28 is adapted to be mounted in the longitudinally extended slots 26 and 27 in the shear key portions 14a and 13a, respectively. The slot 26 is centrally disposed in the key part 14a and extends inwardly and upwardly from the lower concave surface 16a. The slot 27 is centrally disposed and extends downwardly into the key part 13a from the upper convexely curved surface 15a. The shear key embodiment of FIGS. 5 through 7 may be used over and over again by merely replacing the shear strip 28 which is made from low shear strength metal or the like and which extends the full length of the key parts 13a and 14a. The embodiment of FIGS. 5 through 7 functions in the same manner as the embodiment of FIGS. 1 through 4.

A third embodiment of the invention is illustrated in FIGS. 8, 9 and 10, and comprises the two portions 13b and 14b which function in the same manner as the shear key portions 13 and 14 of the first embodiment. The shear key portions 13b and 14b are vertically spaced apart and interconnected by the central longitudinally extended integral portion 29 which may be termed the shear part of the shear key. The lower sides of the upper key portion 14b are tapered downwardly and inwardly as indicated by the numerals 30 and 31. The upper surfaces of the key portion or part 13b are tapered upwardly and inwardly as indicated by the numerals 32 and 33. It will be seen that the key parts 13b and 14b are spaced apart along the adjacent surfaces thereof by substantially longitudinally extended V-shaped grooves and the centrally disposed shear section 29. The shear key of FIGS. 8 through 10 functions in the same manner as the embodiment of FIG. 1 with the exception that the shear key is not re-usable but must be replaced by an entirely new shear key when the shear section 29 breaks. The term "shear means" is used in the claims to indicate either the shear pins 21, the shear strip 28 or the integral shear section 29. The strength of the cross sectional area of the shear section 29 determines when the maximum torque will cause the key to shear.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A shear key for connecting a shaft and a wheel together comprising: an elongated first key part for mounting in the periphery of the shaft; an elongated second key part for mounting in the periphery of the wheel surface engaging the shaft; and, a shear means interconnecting said first and second elongated key parts and breakable when a predetermined overload is impressed on the shaft.

2. The shear key as defined in claim 1, wherein: said shear means comprises, a longitudinally extended, centrally disposed integral breakable shear section which is smaller in cross section than said first and second key parts.

3. The shear key as defined in claim 1, wherein: said shear means comprises, a longitudinally extended, centrally disposed breakable shear strip releasably connecting said first and second key parts and being smaller in cross section than said first and second key parts and with a first portion of said shear strip being slidably mounted in a central longitudinal slot in the first key part and a second portion of the shear strip being slidably mounted in a longitudinal central slot in the second key part.

4. The shear key as defined in claim 1, wherein: said shear means comprises, the plurality of longitudinally spaced apart shear pins interconnecting said first and second key parts.

5. A shear key for connecting a shaft and wheel together, comprising: an elongated first key part for mounting in the periphery of the shaft; an elongated second key part for mounting in the periphery of the wheel surface engaging the shaft; the outer surface of the first key part being formed to the radius of the shaft; the outer surface of the second key part being formed to the radius of the wheel surface engaging the shaft; and, a shear means interconnecting said first and second elongated key parts and breakable when a predetermined load is impressed on the shaft.

6. The shear key as defined in claim 5, wherein: said shear means comprises a longitudinally extended, centrally disposed breakable shear strip releasably connecting said first and second key parts and being smaller in cross section than said first and second key parts and with a first portion of said shear strip being slidably mounted in a central longitudinal slot in the first key part and a second portion of the shear strip being slidably mounted in a longitudinal central slot in the second key part.

7. A shear key as defined in claim 5, wherein: said shear means comprises, a plurality of longitudinally spaced apart shear pins which are disposed perpendicularly to the longitudinal axes of the key parts and which interconnect said first and second key parts.

References Cited in the file of this patent

UNITED STATES PATENTS

| 1,685,098 | Skovsky | Sept. 25, 1928 |
| 2,388,186 | Rowsey | Oct. 30, 1945 |
| 2,487,449 | Knudson | Nov. 8, 1949 |
| 2,585,113 | Gredell | Feb. 12, 1952 |
| 2,828,161 | Whitney | Mar. 25, 1958 |